United States Patent
Sato et al.

(10) Patent No.: US 10,748,392 B2
(45) Date of Patent: Aug. 18, 2020

(54) TACTILE SENSATION PROVIDING APPARATUS

(71) Applicant: ALPS ALPINE CO., LTD., Tokyo (JP)

(72) Inventors: Kunio Sato, Miyagi (JP); Daisuke Takai, Miyagi (JP); Yuzuru Kawana, Miyagi (JP); Katsunari Sato, Nara (JP)

(73) Assignee: ALPS ALPINE CO., LTD., Tokyo (JP)

(*) Notice: Subject to any disclaimer, the term of this patent is extended or adjusted under 35 U.S.C. 154(b) by 0 days.

(21) Appl. No.: 16/420,600

(22) Filed: May 23, 2019

(65) Prior Publication Data

US 2019/0279473 A1    Sep. 12, 2019

Related U.S. Application Data

(63) Continuation of application No. PCT/JP2017/042059, filed on Nov. 22, 2017.

(30) Foreign Application Priority Data

Nov. 28, 2016 (JP) .................. 2016-230450

(51) Int. Cl.
*G08B 6/00* (2006.01)
*F25B 21/04* (2006.01)
*G06F 3/01* (2006.01)
*H04M 19/04* (2006.01)
*H05B 1/02* (2006.01)

(52) U.S. Cl.
CPC .............. *G08B 6/00* (2013.01); *F25B 21/04* (2013.01); *G06F 3/01* (2013.01); *H05B 1/0288* (2013.01)

(58) Field of Classification Search
CPC ......................................... G08B 6/00
See application file for complete search history.

(56) References Cited

U.S. PATENT DOCUMENTS

| 2013/0180354 A1* | 7/2013 | Maranville | B62D 1/065 74/552 |
| 2015/0329137 A1* | 11/2015 | Onica | B62D 1/065 165/59 |
| 2016/0159370 A1* | 6/2016 | Muramatsu | B60W 50/14 701/1 |
| 2017/0352794 A1* | 12/2017 | Takagi | B32B 25/20 |

FOREIGN PATENT DOCUMENTS

| JP | H07-072018 | 3/1995 |
| JP | 2003-091233 | 3/2003 |
| JP | 2010-173585 | 8/2010 |

OTHER PUBLICATIONS

International Search Report for PCT/JP2017/042059 dated Jan. 23, 2018 with English translation.

\* cited by examiner

*Primary Examiner* — Joseph H Feild
*Assistant Examiner* — Pameshanand Mahase
(74) *Attorney, Agent, or Firm* — IPUSA, PLLC

(57) ABSTRACT

A tactile sensation providing apparatus includes a contact region to be touched by an operating body, a thermal sensation providing element that is disposed in the contact region and provides at least cold sensation information, and a warm sensation providing element that is disposed in the contact region and provides warm sensation information. The warm sensation providing element is disposed at least in regions that sandwich the thermal sensation providing element.

8 Claims, 6 Drawing Sheets

TACTILE SENSATION PROVIDING APPARATUS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/042059, filed on Nov. 22, 2017, which is based on and claims the benefit of priority of Japanese Patent Application No. 2016-230450 filed on Nov. 28, 2016, the entire contents of which are incorporated herein by reference.

BACKGROUND OF THE INVENTION

1. Field of the Invention

An aspect of this disclosure relates to a tactile sensation providing apparatus.

2. Description of the Related Art

Japanese Laid-Open Patent Publication No. H07-072018 discloses an apparatus that includes, on a pedestal, a tactile sensation providing apparatus for providing a tactile sensation by generating a vibration with, for example, a voice coil or a piezoelectric element, a Peltier element for providing a temperature sensation, and a sensor for measuring a skin temperature. The tactile sensation providing apparatus and the sensor are mounted directly on the pedestal, and the Peltier element is mounted on the tactile sensation providing apparatus. This configuration makes it possible to provide a tactile sensation by not only using a vibration but also taking into account the influence of a temperature, and makes it possible to implement a tactile sensation providing apparatus with higher expressive power.

According to a research conducted by the inventors, warm sensation information needs to be provided using an area greater than a predetermined value. For this reason, when multiple Peltier elements are arranged in the apparatus of Japanese Laid-Open Patent Publication No. H07-072018 to simultaneously provide warm sensation information and cold sensation information and when the area of the Peltier elements is small, warm sensation information may not be reliably provided to an operator and as a result, it may become difficult to provide a fine tactile sensation. On the other hand, when the size of each Peltier element is increased to reliably provide warm sensation information, the size of the entire apparatus increases. Also, because large Peltier elements are expensive, using large Peltier elements increases the costs of a product.

SUMMARY OF THE INVENTION

In an aspect of this disclosure, there is provided a tactile sensation providing apparatus including a contact region to be touched by an operating body, a thermal sensation providing element that is disposed in the contact region and provides at least cold sensation information, and a warm sensation providing element that is disposed in the contact region and provides warm sensation information. The warm sensation providing element is disposed at least in regions that sandwich the thermal sensation providing element.

DESCRIPTION OF THE PREFERRED EMBODIMENTS

Figure 1:
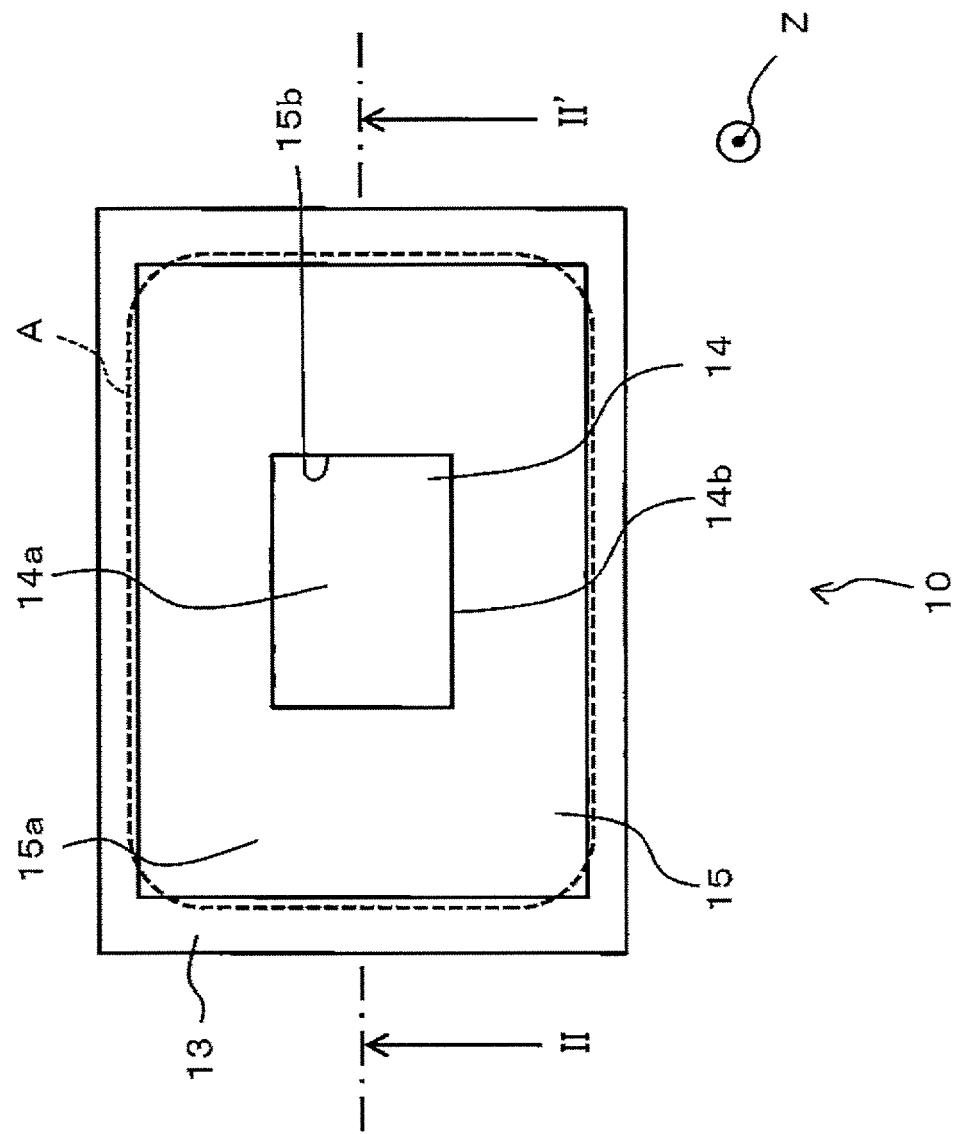
FIG. 1 is a plan view of a tactile sensation providing apparatus according to an embodiment.
Figure 2:
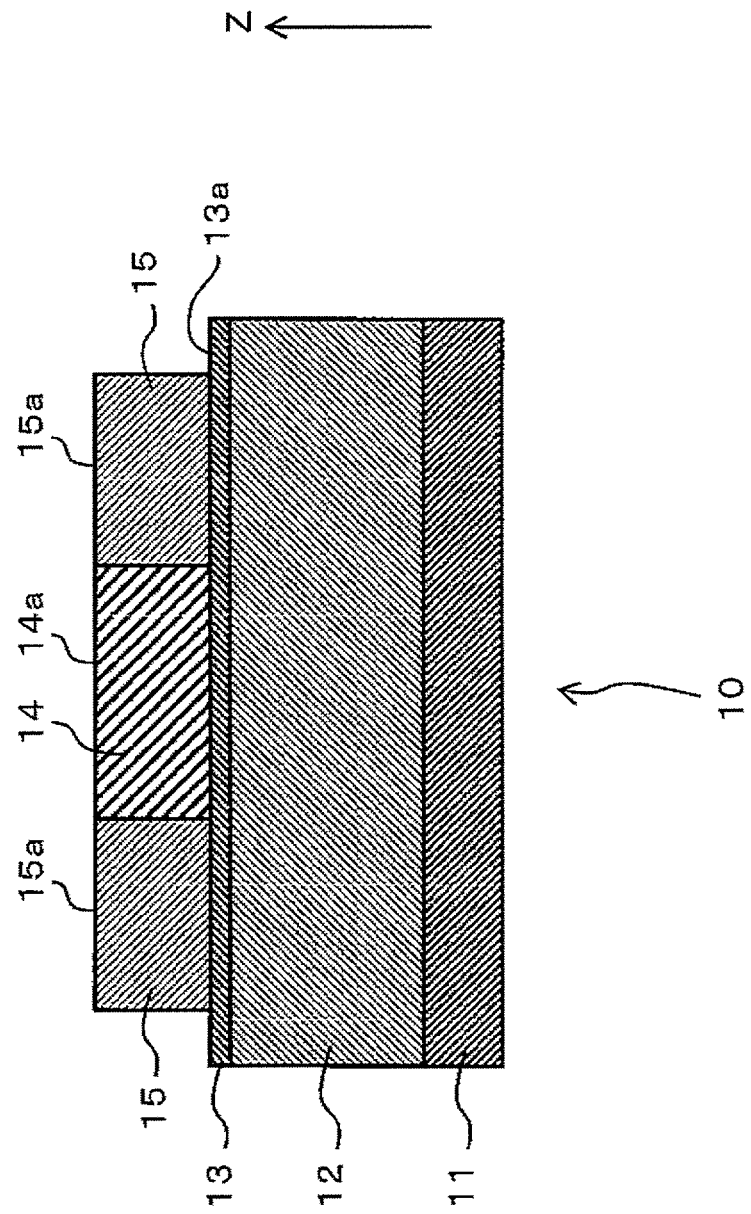
FIG. 2 is a cross-sectional view taken along line II-II' of FIG. 1.
Figure 3:
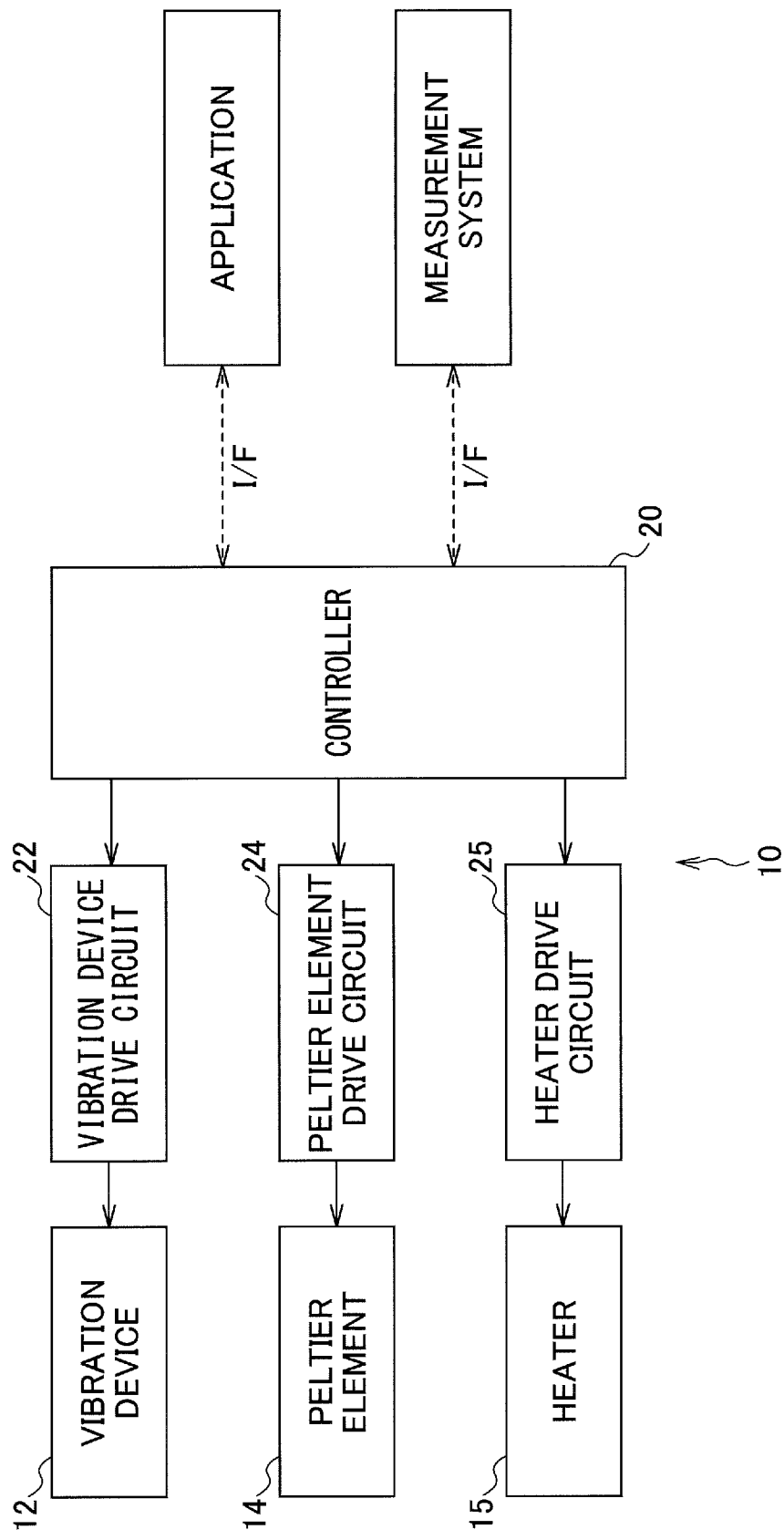
FIG. 3 is a functional block diagram of a tactile sensation providing apparatus according to an embodiment.

Tactile sensation providing apparatuses according to embodiments of the present invention are described below with reference to the accompanying drawings. FIG. 1 is a plan view of a tactile sensation providing apparatus 10 according to an embodiment. FIG. 2 is a cross-sectional view taken along line II-II' of FIG. 1. FIG. 3 is a functional block diagram of the tactile sensation providing apparatus 10. In the descriptions below, a view seen from above in a Z direction may be referred to as a plan view.

As illustrated in FIG. 2, the tactile sensation providing apparatus 10 includes a base 11 comprised of, for example, a synthetic resin material, a vibration device (element) 12 disposed on the base 11, a conductive part 13 disposed on the vibration device 12, and a Peltier element 14 and a heater 15 disposed on the conductive part 13. The Peltier element 14 is used as a thermal sensation providing element, and the heater 15 is used as a warm sensation providing element. As illustrated in FIG. 3, the tactile sensation providing apparatus 10 also includes a controller 20, a vibration device drive circuit 22, a Peltier element drive circuit 24, and a heater drive circuit 25. The controller 20 outputs control signals to the vibration device drive circuit 22, the Peltier element drive circuit 24, and the heater drive circuit 25.

The base 11 may be an operation button such as a push button or a rotation button provided on an operation device. In this case, the operation device may include a detection part such as a switch mechanism that operates when the base 11 implemented by a push button is pushed.

For example, the vibration device 12 has a configuration where a vibrator is disposed in a metal case or cover and supported by an elastic part such as a plate spring so as to be able to vibrate. A coil is wound around the vibrator, and a magnet facing the coil is fixed in the case. When the vibration device drive circuit 22 applies an alternating current to the coil according to a control signal received from the controller 20, the vibrator vibrates and enables the vibration device 12 to provide vibration information. That is, the vibration device 12 provides vibration information under the control of the controller 20. The strength and period of vibration can be controlled by changing the control signal supplied by the controller 20.

The vibration device 12 may also be configured such that the vibrator is formed of a magnet and the coil is fixed in the case to face the vibrator. Further, the vibration device 12 may be implemented by a piezoelectric element that vibrates according to a control signal from the controller 20.

The conductive part 13 may be implemented by, for example, an adhesive tape disposed to cover the upper surface of the vibration device 12. By the adhesion of the adhesive tape, the conductive part 13 is fixed to the vibration device 12, and the Peltier element 14 and the heater 15 are fixed to the upper surface of the conductive part 13. Thus, the conductive part 13 joins the vibration device 12 and the Peltier element 14 to each other and joins the vibration device 12 and the heater 15 to each other.

The conductive part 13 functions as a thermal conduction part that transfers heat generated when the Peltier element 14 provides thermal sensation information and heat generated when the heater 15 provides warm sensation information to the metal case of the vibration device 12. The conductive part 13 also functions as a vibration transmission part that transmits vibration information provided by the vibration device 12 to each of the Peltier element 14 and the heater 15.

Because the conductive part 13 has adhesion and vibration transmissibility, the conductive part 13 can efficiently transmit vibration information provided by the vibration device 12 to the surfaces of the Peltier element 14 and the heater 15. Further, because the conductive part 13 has thermal conductivity, the conductive part 13 can diffuse heat generated by the Peltier element 14 and the heater 15, and can efficiently transfer heat from the lower surfaces of the Peltier element 14 and the heater 15 to, particularly, the metal case of the vibration device 12. Thus, the metal case can be used as a heat sink to improve radiation efficiency.

The Peltier element 14 and the heater 15 are disposed on the conductive part 13. As illustrated in FIG. 1, the Peltier element 14 has a rectangular shape in plan view and is disposed in the middle of an upper surface 13a of the conductive part 13 having a rectangular shape in plan view. The heater 15 has a rectangular shape in plan view, and a rectangular opening 15b is formed in the middle of the heater 15 in plan view. The Peltier element 14 is disposed on the conductive part 13 in the opening 15b. Accordingly, the entire periphery of the Peltier element 14 is surrounded by the heater 15.

The Peltier element 14 and the heater 15 may have circular or oval shapes instead of rectangular shapes in plan view. Even in such a case, the Peltier element 14 is disposed in the opening 15b of the heater 15 and surrounded by the heater 15.

As illustrated in FIG. 1, in plan view, the outer shape and the area of a region occupied by the heater 15 are substantially equal to those of a contact region A that corresponds to an operating surface of a finger that is an operating body. Here, the operating surface of the finger is a finger pad, and the contact region A corresponds to a region on the Peltier element 14 and the heater 15 that the finger pad contacts. When the finger contacts the heater 15, the finger simultaneously contacts the Peltier element 14 located in the middle of the heater 15. That is, the contact region A is set to include the Peltier element 14 and at least a portion of the heater 15 surrounding the Peltier element 14. The region occupied by the heater 15 is most preferably has the same area and shape as those of the contact region A. However, the contact region A may be larger than the outer shape of the heater 15 or may have an area that is greater than or equal to 50% of the area occupied by the heater 15. Also, the area of the Peltier element 14 is preferably less than or equal to 60% of the area of the contact region A, i.e., the area of the contacting finger pad, and is more preferably less than or equal to 50% of the area of the contact region A.

Also, a surface 14a of the Peltier element 14 and a surface 15a of the heater 15 are preferably at the same height in the Z direction and may constitute a contact part that the finger, which is an operating body, can contact. This configuration enables the operator to comfortably operate, for example, an operation button without noticing the boundary between the Peltier element 14 and the heater 15. Further, compared with a configuration where one Peltier element is used to provide warm sensation information and cold sensation information alternately, a configuration including both the Peltier element 14 and the heater 15 can improve the power efficiency and increase the speed of providing sensation information.

In the example illustrated by FIGS. 1 and 2, the Peltier element 14 is disposed such that a side surface 14b of the Peltier element 14 contacts the inner surface of the opening 15b of the heater 15. However, a gap is preferably formed at the interface between the Peltier element 14 and the heater 15 as a heat shielding region, and a resin having a heat insulating effect may be placed in the gap. In plan view, the area occupied by the heater 15 alone is preferably greater than the area occupied by the Peltier element 14 alone.

The Peltier element 14, for example, uses the transfer of heat caused by the Peltier effect when a direct current is supplied from the controller 20 to a junction between two metal plates facing each other in the Z direction. In the Peltier element 14, the quantity of heat on the surfaces of the two metal plates varies depending on the current direction. Thus, by controlling the direction and the amount of an electric current supplied to the Peltier element 14, it is possible to cause a finger touching the Peltier element 14 to feel a warm temperature and a cold temperature and to provide thermal sensation information.

The heater 15 includes an electrical resistor that generates heat according to the amount and the cycle of an electric current provided as a drive signal from the heater drive circuit 25. The electrical resistor may be implemented by, for example, a resistor pattern that is printed with carbon on a substrate. For example, the heater 15 includes a substrate having a shape that surrounds the Peltier element 14 and a resistor pattern composed of meandering patterns formed on a surface of the substrate. According to a control signal supplied from the controller 20, the heater drive circuit 25 supplies an electric current to the heater 15 to cause the heater 15 to generate heat and provide warm sensation information that causes a finger touching the surface of the heater 15 to feel a warm temperature.

Instead of the heater 15, a Peltier element with the corresponding planar shape may be used to provide warm sensation information.

When the heater 15, which is a warm stimulator for providing a warm stimulus that causes a touching hand or finger (operating body) to feel a warm temperature, and the Peltier element 14, which is a cold stimulator for providing a cold stimulus that causes the hand or finger to feel a cold temperature, are arranged alternately, a pain sensation may be generated even with a combination of temperature stimuli (e.g., 20° C. and 40° C.) that does not normally cause a pain sensation (Thermal Grill Illusion). For example, a pain sensation may be generated by providing a warm stimulus with a certain degree of strength (e.g., a warm stimulus greater than or equal to 4° C./s) and a cold stimulus at the same time from the warm stimulator and the cold stimulator.

As illustrated in FIG. 3, the Peltier element 14 and the heater 15 are connected to the Peltier element drive circuit 24 and the heater drive circuit 25, respectively, and are also connected to the controller 20 that temperature-controls the Peltier element 14 and the heater 15 separately. Control signals are supplied, respectively, to the Peltier element drive circuit 24 and the heater drive circuit 25 from the controller 20, a drive signal based on the control signal is supplied from the Peltier element drive circuit 24 to the Peltier element 14, and at the same time or at different timing, a drive signal based on the control signal is supplied from the heater drive circuit 25 to the heater 15. Then, the Peltier element 14 and the heater 15 are driven according to the drive signals.

In a method of controlling the Peltier element 14 and the heater 15, the controller 20 first causes the Peltier element 14 to provide cold sensation information and causes the heater 15 to provide warm sensation information. When providing a cold sensation to a finger that is an operating body touching the contact region A, the controller 20 drives only the Peltier element 14 located in the middle. When providing a warm sensation to the finger touching the contact region A, the controller 20 drives only the heater 15 located on the periphery of the tactile sensation providing apparatus 10. According to research conducted by the inventors of the present invention, a sufficient cold sensation can be provided to a finger by stimulatingly providing low-temperature information to a small region of the finger, but heat needs to be applied to a comparatively-large region of the finger to provide a warm sensation to the finger. Accordingly, a sufficient cold sensation can be provided to the finger by driving the Peltier element 14 to cool a small region in the middle of the finger. The heater 15 surrounds the Peltier element 14 and has an area that is greater than the area of the Peltier element 14. Therefore, even if the Peltier element 14 is stopped, a sufficient warm sensation can be provided to the finger by applying heat to the finger using the heater 15.

Here, the skin temperature (adaptation temperature) of the finger before receiving warm and cold stimuli by contacting the Peltier element 14 and the heater 15 influences the sensitivity (threshold) to a warm sensation and a cold sensation. The finger becomes more sensitive to a warm sensation as the adaptation temperature of the fingertip contacting the Peltier element increases, and becomes more sensitive to a cold sensation as the adaptation temperature of the fingertip contacting the Peltier element decreases. In other words, the finger becomes more sensitive to a warm stimulus as the adaptation temperature increases, and becomes more sensitive to a cold stimulus as the adaptation temperature decreases. Accordingly, it is possible to clearly provide a warm or cold stimulus with a small temperature change by accurately determining the skin temperature of the finger using a temperature sensor (not shown) and by increasing or decreasing the skin temperature by driving the Peltier element based on the determined skin temperature. For example, if the fingertip temperature is 32° C., the finger can feel a warm sensation when the fingertip temperature is increased by 2° C. to 34° C. Also, if the fingertip temperature is 35° C., the finger can feel a warm sensation when the fingertip temperature is increased by just 1° C. to 36° C. Similarly, if the fingertip temperature is 32° C., the finger can feel a cold sensation when the fingertip temperature is decreased by 1° C. to 31° C. Also, if the fingertip temperature is 29° C., the finger can feel a cold sensation when the fingertip temperature is decreased by just 0.5° C. to 28.5° C.

In the example illustrated in FIG. 1, a cold sensation and a warm sensation can be separately provided to the finger using the Peltier element 14 with a small size. In other words, the configuration of FIG. 1 makes it possible to reduce the area of the Peltier element 14, which is expensive, and thereby reduce the production costs. Here, the response speed of the Peltier element 14 is faster than the response speed of the heater 15. Therefore, even if heat generated by the heater 15 slightly remains when the Peltier element 14 is driven immediately after the heater 15 is stopped, it is possible to cause the finger to instantly feel a change from a warm sensation to a cold sensation by stimulatingly cooling the central portion of the finger pad using the Peltier element 14.

In the tactile sensation providing apparatus 10 of the embodiment, for example, the Peltier element 14 can be driven to provide a warm sensation to the finger while driving the heater 15. In this case, a warm sensation is first provided to the finger by the Peltier element 14 with a high response speed and is then provided by the heater 15. This method makes it possible to quickly increase the temperature applied to the finger and provide a comparatively hot sensation to the finger. Also, the Peltier element 14 and the heater 15 may be activated simultaneously, and the Peltier element 14 may be stopped immediately after the temperature of the heater 15 increases.

Next, exemplary operations of the tactile sensation providing apparatus 10 and an example of a tactile sensation providing process are described.

The controller 20 generates, as tactile sensation control signals, a thermal sensation control signal for causing the Peltier element 14 to provide warm or cold sensation information (thermal sensation information), a warm sensation control signal for causing the heater 15 to provide warm sensation information, and a vibration control signal for causing the vibration device 12 to provide vibration information. Here, the controller 20 may generate control signals for all of the Peltier element 14, the heater 15, and the vibration device 12. Also, the controller 20 may generate control signals only for one or two of the Peltier element 14, the heater 15, and the vibration device 12. For example, the control signals may be generated based on the state of the switch mechanism that is operated when the tactile sensation providing apparatus 10 is pressed as an operation button.

The thermal sensation control signal generated by the controller 20 is provided to the Peltier element drive circuit 24. The Peltier element drive circuit 24 outputs a drive signal based on the thermal sensation control signal, and the quantity of heat on the surface 14a of the Peltier element 14 changes according to the drive signal. The warm sensation control signal is provided to the heater drive circuit 25. The heater drive circuit 25 outputs a drive signal based on the warm sensation control signal, and the quantity of heat on the surface 15a of the heater 15 changes according to the drive signal. When the finger simultaneously touches the Peltier element 14 and the heater 15 whose heat quantities have changed, the finger feels, in addition to a temperature change, a change in the tactile sensation that is caused by differences in temperature and drive conditions between the Peltier element 14 and the heater 15. The provision of thermal sensation information by the Peltier element 14 and the provision of warm sensation information by the heater 15 are controlled independently of each other, and may be performed simultaneously or separately.

The vibration control signal is provided to the vibration device 12, and the vibration device 12 generates vibration according to the vibration control signal. The vibration is transmitted to the finger via the Peltier element 14 and the heater 15.

As exemplified in FIG. 3, the controller 20 may be connected via interfaces (I/F) to an external application and an external measurement system. Even when connected to the application and the measurement system, the controller 20 can change the thermal sensation information provided by the Peltier element 14, the warm sensation information provided by the heater 15, and the vibration information provided by the vibration device 12.

Variations of the above embodiment are described below.

Figure 4:
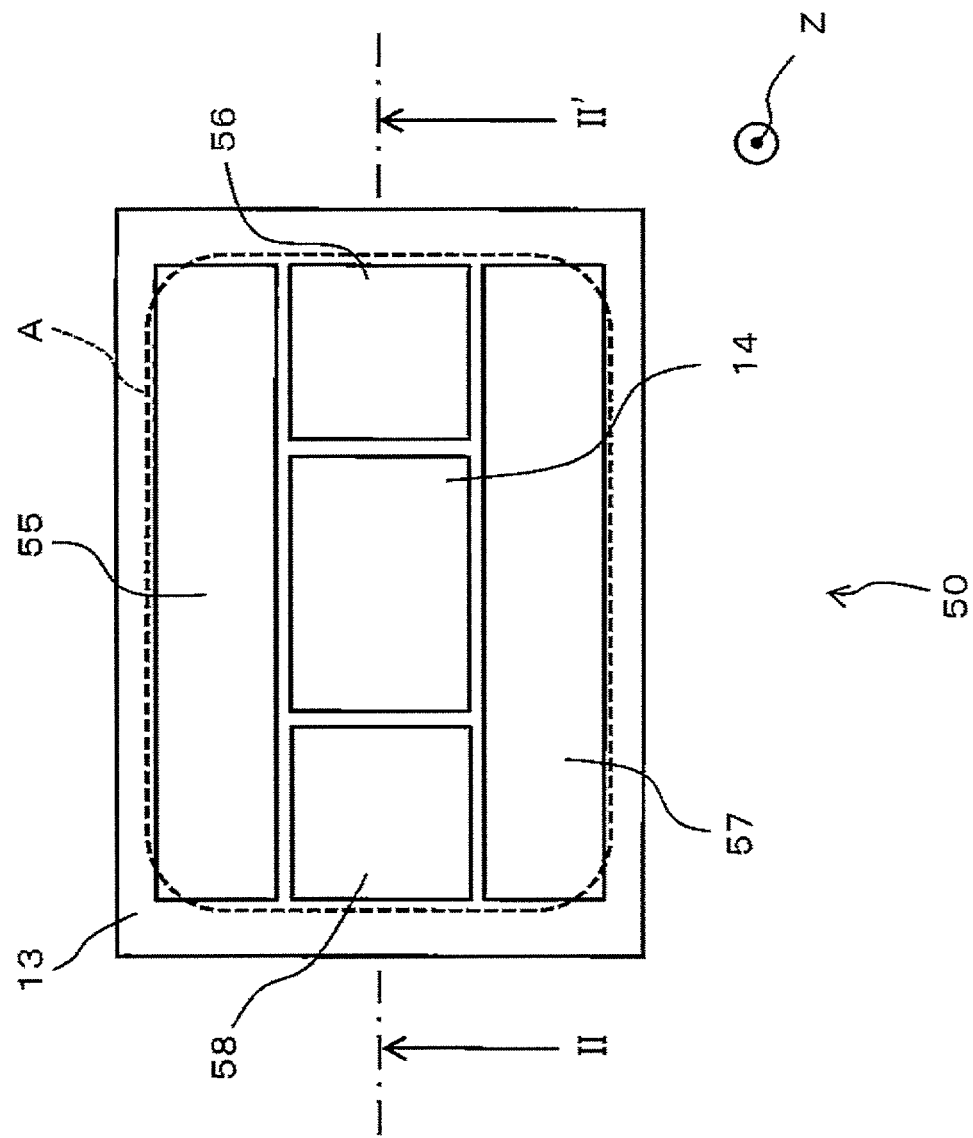
FIG. 4 is a plan view of a tactile sensation providing apparatus according to a first variation.
Figure 5:
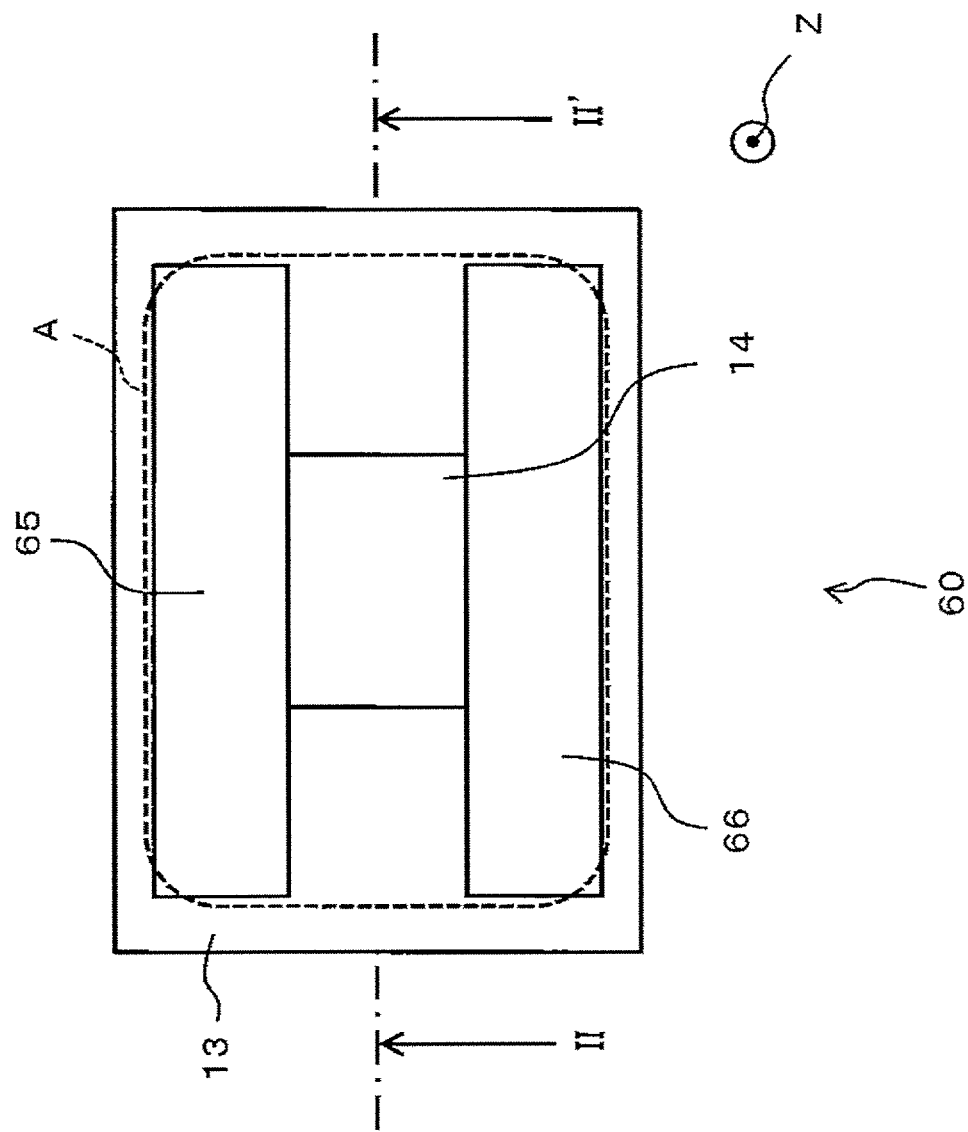
FIG. 5 is a plan view of a tactile sensation providing apparatus according to a second variation.
Figure 6:
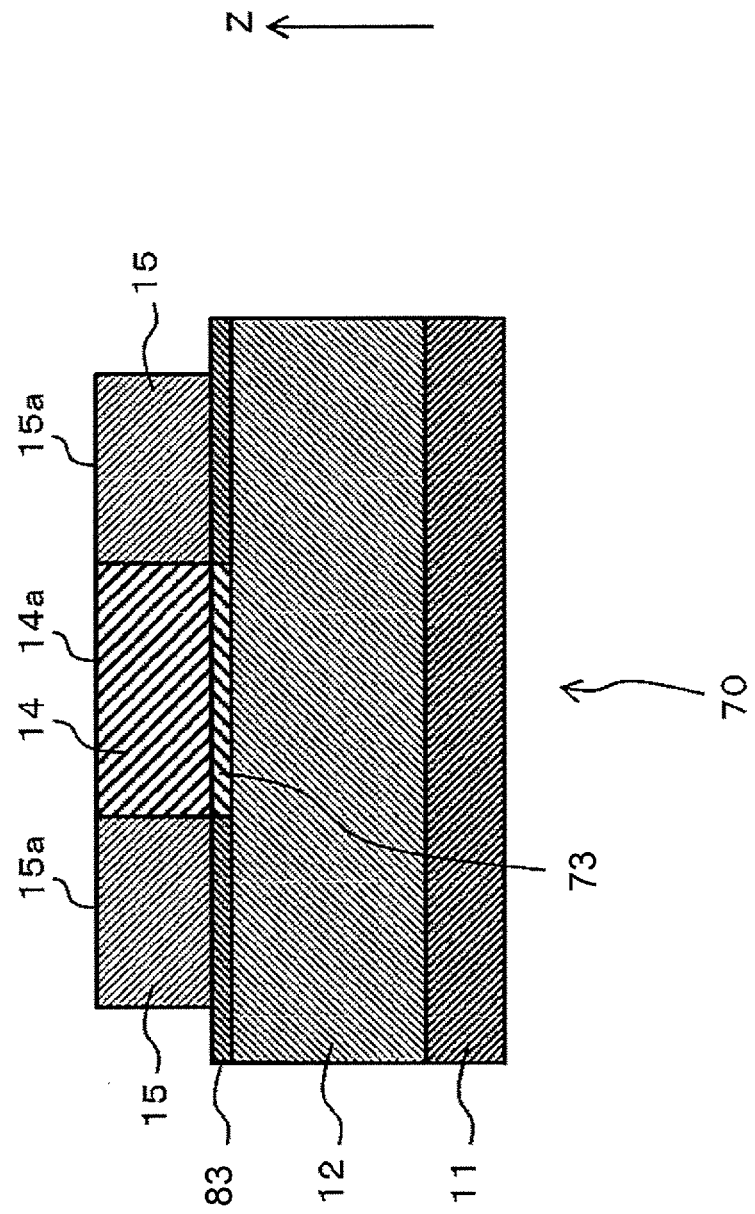
FIG. 6 is a cross-sectional view of a tactile sensation providing apparatus according to a third variation.

FIG. 4 is a plan view of a tactile sensation providing apparatus 50 according to a first variation. FIG. 5 is a plan view of a tactile sensation providing apparatus 60 according to a second variation. FIG. 6 is a cross-sectional view of a tactile sensation providing apparatus 70 according to a third variation. In FIGS. 4, 5, and 6, the same reference numbers as those used in FIG. 1 are assigned to components that are the same as the components of the tactile sensation providing apparatus 10 in FIG. 1. FIG. 6 is a cross-sectional view corresponding to the cross-sectional view of FIG. 2.

In the tactile sensation providing apparatus 10 of FIG. 1, the entire periphery of the Peltier element 14 is surrounded by the heater 15 in plan view. Alternatively, as illustrated in FIG. 4, the Peltier element 14 may be intermittently surrounded by heaters. In the tactile sensation providing apparatus 50 of FIG. 4, four heaters 55, 56, 57, and 58 are arranged to surround the Peltier element 14, on the conductive part 13 in a region corresponding to the contact region A. When the four heaters 55, 56, 57, and 58 of the tactile sensation providing apparatus 50 are driven to provide warm sensation information without driving the Peltier element 14, the finger touching the heaters 55, 56, 57, and 58 may feel such that the entire contact region A including a region corresponding to the Peltier element 14 has a warm temperature. This effect can be obtained as long as the periphery of the Peltier element 14 is intermittently surrounded by heaters regardless of the number and the shape of the heaters. Still, to obtain this effect, the total area of the four heaters 55, 56, 57, and 58 is preferably greater than or equal to the area of the Peltier element 14. Also, in place of one or more of the heaters 55, 56, 57, and 58, Peltier elements having the corresponding shape(s) may be used to provide warm sensation information.

Further, as illustrated in FIG. 5, the above effect can be obtained by arranging two heaters 65 and 66 to face each other across the Peltier element 14 in a region corresponding to the contact region A. Here, although the two heaters 65 and 66 do not necessarily have the same shape, to obtain the above effect, the total area of the heaters 65 and 66 is preferably greater than or equal to the area of the Peltier element 14. In the example of FIG. 5, a pair of heaters are arranged to face each other across the Peltier element 14. However, multiple pairs of heaters may be arranged such that heaters in each pair face each other across the Peltier element 14. Instead of the heaters 65 and 66, two Peltier elements with the corresponding planar shape may be used to provide warm sensation information.

Also, the vibration device 12 may be omitted, and the Peltier element 14 and the heater 15 may be provided on the surface of the base 11 that is an operation button such as a push button or a rotation button.

In the above embodiment, the conductive part 13 having thermal conductivity and vibration transmissibility is disposed between the Peltier element 14 and the heater 15 and the vibration device 12. Alternatively, as illustrated in FIG. 6, a first conductive part 73 may be disposed between the Peltier element 14 and the vibration device 12 and a second conductive part 83 may be disposed between the heater 15 and the vibration device 12.

Similarly to the conductive part 13 of the above embodiment, the first conductive part 73 functions as a thermal conduction part that transfers heat, which is generated when the Peltier element 14 provides thermal sensation information, to the metal case of the vibration device 12, and also functions as a vibration transmission part that transmits vibration information provided by the vibration device 12 to the Peltier element 14. This configuration makes it possible to efficiently transfer heat from the lower surface of the Peltier element 14 to the vibration device 12 and to radiate the heat through a metal case (cover) of the vibration device 12.

On the other hand, the second conductive part 83 functions as a thermal insulation part that blocks heat generated when the heater 15 provides warm sensation information, and also functions as a vibration transmission part that transmits vibration information provided by the vibration device 12 to the heater 15. Providing the second conductive part 83 having a thermal insulation property makes it possible to suppress the transfer of heat from the heater 15 to the vibration device 12 and thereby makes it possible to effectively maintain the warm sensation information provided by the heater 15. Also, the second conductive part 83 can suppress the transfer of heat to the Peltier element 14. This in turn makes it possible to prevent thermal sensation information provided by the Peltier element 14 from being changed by the heat, and to prevent the heat from lowering the speed at which the Peltier element 14 switches thermal sensation information.

In the third variation illustrated in FIG. 6, a thermal insulation part is preferably provided also between the Peltier element 14 and the heater 15 to prevent transfer of heat between these components.

A tactile sensation providing apparatus according to an embodiment of the present invention is described above. However, the present invention is not limited to the specifically disclosed embodiment, and variations and modifications may be made without departing from the scope of the present invention.

As described above, an aspect of this disclosure makes it is possible to provide a tactile sensation providing apparatus that can simultaneously provide warm sensation information and cold sensation information and can still provide accurate warm sensation information, without increasing the size of the tactile sensation providing apparatus.

An aspect of this disclosure provides a tactile sensation providing apparatus that includes a contact region to be touched by an operating body, a thermal sensation providing element that is disposed in the contact region and provides at least cold sensation information, and a warm sensation providing element that is disposed in the contact region and provides warm sensation information. The warm sensation providing element is disposed at least in regions that sandwich the thermal sensation providing element.

This configuration makes it possible to provide a tactile sensation providing apparatus that can simultaneously provide warm sensation information and cold sensation information and can still provide accurate warm sensation information, without increasing the size of the tactile sensation providing apparatus. Also, this configuration enables the operating body to simultaneously contact the thermal sensation providing element and the warm sensation providing element and thereby makes it possible to provide complex thermal sensation information. Further, compared with a configuration where one thermal sensation providing element is used to provide warm sensation information and cold sensation information alternately, a configuration including both the thermal sensation providing element and the warm sensation providing element can improve the power efficiency and increase the speed of providing sensation information.

The warm sensation providing element is preferably disposed to surround the entire periphery of the thermal sensation providing element. Alternatively, the warm sensation providing element may include two warm sensation providing elements that are disposed to face each other across the thermal sensation providing element.

With the above configurations, even if the warm sensation providing element is driven without driving the thermal sensation providing element, an operator may feel warm sensation in the entire contact region including the region corresponding to the thermal sensation providing element. Accordingly, compared with a configuration where the warm sensation providing element occupies the entire contact region, the above configurations make it possible to reduce the current consumption and the material costs. Also, the above configurations make it possible to provide cold sensation information using a region whose area is sufficiently smaller than the area of the finger pad and to cause the operator to acutely feel the cold sensation.

The warm sensation providing element is preferably a heater.

This configuration makes it possible to reduce the cost of the warm sensation providing element that occupies a larger area.

The tactile sensation providing apparatus may further include a vibration element, and the thermal sensation providing element and the warm sensation providing element are preferably disposed over the vibration element.

This configuration makes it possible to provide a tactile sensation that includes vibration information provided by the vibration element in addition to the warm sensation information and/or the cold sensation information, and thereby makes it possible to provide a more complex and delicate tactile sensation.

The tactile sensation providing apparatus preferably includes a conductive part disposed between the vibration element and each of the thermal sensation providing element and the warm sensation providing element. The conductive part transfers, to the vibration element, heat generated when the thermal sensation providing element provides thermal sensation information and heat generated when the warm sensation providing element provides the warm sensation information, and transmits vibration information provided by the vibration element to the thermal sensation providing element and the warm sensation providing element.

This configuration makes it possible to efficiently transmit the vibration information provided by the vibration element to the thermal sensation providing element and the warm sensation providing element, and makes it possible to efficiently transfer heat generated by the thermal sensation providing element and the warm sensation providing element and thereby improve the radiation efficiency.

The conductive part preferably has adhesion and joins the thermal sensation providing element and the warm sensation providing element to the vibration element.

This configuration makes it possible to reliably transmit the vibration information provided by the vibration element to the thermal sensation providing element and the warm sensation providing element, and makes it possible to efficiently transfer heat generated by the thermal sensation providing element and the warm sensation providing element.

The tactile sensation providing apparatus preferably includes a thermal conduction part that is disposed between the thermal sensation providing element and the vibration element and transfers heat generated when the thermal sensation providing element provides thermal sensation information, and a thermal insulation part that is disposed between the warm sensation providing element and the vibration element and blocks heat generated when the warm sensation providing element provides the warm sensation information. The thermal conduction part and the thermal insulation part also transmit vibration information provided by the vibration element to the thermal sensation providing element and the warm sensation providing element.

This configuration makes it possible to suppress the transfer of heat from the warm sensation providing element to the vibration element and makes it possible to more efficiently maintain the warm sensation information provided by the warm sensation providing element. Also, this configuration makes it possible to suppress the transfer of heat to the thermal sensation providing element. This in turn makes it possible to prevent thermal sensation information provided by the thermal sensation providing element from being changed by the heat, and to prevent the heat from lowering the speed at which the thermal sensation providing element switches thermal sensation information.

The vibration element preferably includes a metal cover. The conductive part joins the thermal sensation providing element and the warm sensation providing element to the metal cover.

This configuration makes it possible to more efficiently transfer heat generated by the thermal sensation providing element and the warm sensation providing element.

What is claimed is:

1. A tactile sensation providing apparatus, comprising:
a contact region to be touched by an operating body;
a vibration element;
a thermal sensation providing element that is disposed in the contact region and provides at least cold sensation information; and
a warm sensation providing element that is disposed in the contact region and provides warm sensation information, wherein
the warm sensation providing element is disposed at least in regions that sandwich the thermal sensation providing element; and
the thermal sensation providing element and the warm sensation providing element are disposed over the vibration element.

2. The tactile sensation providing apparatus as claimed in claim 1, wherein the warm sensation providing element is disposed to surround an entire periphery of the thermal sensation providing element.

3. The tactile sensation providing apparatus as claimed in claim 1, wherein the warm sensation providing element includes two warm sensation providing elements that are disposed to face each other across the thermal sensation providing element.

4. The tactile sensation providing apparatus as claimed in claim 1, wherein the warm sensation providing element is a heater.

5. The tactile sensation providing apparatus as claimed in claim 1, further comprising:
a conductive part disposed between the vibration element and each of the thermal sensation providing element and the warm sensation providing element,
wherein the conductive part
transfers, to the vibration element, heat generated when the thermal sensation providing element provides thermal sensation information and heat generated when the warm sensation providing element provides the warm sensation information, and
transmits vibration information provided by the vibration element to the thermal sensation providing element and the warm sensation providing element.

6. The tactile sensation providing apparatus as claimed in claim 5, wherein the conductive part has adhesion and joins the thermal sensation providing element and the warm sensation providing element to the vibration element.

7. The tactile sensation providing apparatus as claimed in claim 5, wherein
the vibration element includes a metal cover; and
the conductive part joins the thermal sensation providing element and the warm sensation providing element to the metal cover.

8. The tactile sensation providing apparatus as claimed in claim 1, further comprising:
a thermal conduction part that is disposed between the thermal sensation providing element and the vibration element and transfers heat generated when the thermal sensation providing element provides thermal sensation information; and
a thermal insulation part that is disposed between the warm sensation providing element and the vibration element and blocks heat generated when the warm sensation providing element provides the warm sensation information,
wherein the thermal conduction part and the thermal insulation part also transmit vibration information provided by the vibration element to the thermal sensation providing element and the warm sensation providing element.

* * * * *